United States Patent
Sekiguchi et al.

[11] Patent Number: 5,388,879
[45] Date of Patent: Feb. 14, 1995

[54] SUCTION TYPE ROBOT HAND

[75] Inventors: Kazuya Sekiguchi, Ikoma; Masao Taguchi, Osaka; Hitoshi Iwata, Tsuzuki, all of Japan

[73] Assignee: House Food Industrial Co., Ltd., Higashi-Osaka, Japan

[21] Appl. No.: 128,256

[22] Filed: Sep. 28, 1993

Related U.S. Application Data

[63] Continuation of Ser. No. 831,047, Feb. 4, 1992, abandoned.

[51] Int. Cl.$^6$ .............................................. B66C 1/02
[52] U.S. Cl. .................................... 294/64.1; 901/40; 294/907
[58] Field of Search ........................... 294/64.1–65.1, 294/907; 901/40, 46; 414/737, 752

[56] References Cited

U.S. PATENT DOCUMENTS

| | | | |
|---|---|---|---|
| 1,364,229 | 1/1921 | Williamson | 294/64.1 |
| 1,930,778 | 10/1933 | Skidelsky | 294/64.1 X |
| 2,290,916 | 1/1960 | Pagdin . | |
| 2,916,059 | 12/1959 | Wong . | |
| 3,219,380 | 11/1965 | Carliss | 294/64.1 |
| 3,227,299 | 1/1966 | Draxler | 294/64.1 X |
| 3,294,434 | 12/1966 | Sinn | 294/64.1 |
| 3,318,468 | 5/1967 | Olson | 294/64.1 X |
| 3,387,718 | 6/1968 | Roth et al. . | |
| 3,627,369 | 12/1971 | Nixon | 294/64.1 |
| 3,743,340 | 7/1973 | Williamann | 294/64.1 |
| 3,754,751 | 8/1973 | Capetti et al. | 294/64.1 X |
| 3,759,560 | 9/1973 | Yoda et al. | 294/64.1 |
| 3,796,455 | 3/1974 | Linkbom . | |
| 3,826,381 | 7/1974 | Kulig et al. | 294/64.1 X |
| 3,999,795 | 12/1976 | Barker | 294/64.1 |
| 4,006,929 | 2/1977 | Barker . | |
| 4,340,234 | 7/1982 | Ise | 294/64.1 X |
| 4,505,505 | 3/1985 | Senaratne . | |
| 4,582,353 | 4/1986 | Alvernhe . | |
| 4,639,030 | 1/1987 | Bini . | |
| 4,750,768 | 6/1988 | Kumar | 294/64.1 |
| 4,850,627 | 7/1989 | Franklin | 294/64.1 X |
| 4,858,975 | 8/1989 | Ogawa . | |
| 4,917,427 | 4/1990 | Scaglia | 294/64.1 |

FOREIGN PATENT DOCUMENTS

| | | | |
|---|---|---|---|
| 084479 | 7/1983 | European Pat. Off. . | |
| 0104871 | 4/1984 | European Pat. Off. . | |
| 260128 | 3/1988 | European Pat. Off. . | |
| 3518640 | 11/1986 | Germany . | |
| 61-58084 | 4/1986 | Japan . | |
| 63-251186 | 10/1988 | Japan . | |
| 63-283884 | 11/1988 | Japan . | |
| 64-8141 | 1/1989 | Japan . | |
| 86488 | 4/1991 | Japan | 294/64.1 |
| 8900259 | 9/1990 | Netherlands . | |
| 455201 | 6/1968 | Switzerland . | |
| 1216630 | 12/1970 | United Kingdom | 294/64.1 |
| 1546086 | 5/1979 | United Kingdom . | |
| 2113178 | 8/1983 | United Kingdom . | |
| 992381 | 2/1983 | U.S.S.R. . | |
| 1576465 | 7/1990 | U.S.S.R. | 294/64.1 |

OTHER PUBLICATIONS

Western Electric Technical Digest, No. 40, Oct. 1975.

*Primary Examiner*—Dean J. Kramer
*Attorney, Agent, or Firm*—Popham, Haik, Schnobrich & Kaufman

[57] ABSTRACT

A suction-type metering robot hand comprising (a) a hollow suction pad having a gas-permeable obstacle at an opening of the suction pad; and (b) a main body of the robot hand supporting the suction pad and having a vacuum passage communicating with the suction pad. According to the robot hand of the present invention, the provision of the net on the opening of the suction pad makes it possible to suck fragile articles such as a fried cutlet, roasted bean curd, a piece of bread and the like to a desired place.

15 Claims, 3 Drawing Sheets

5,388,879

SUCTION TYPE ROBOT HAND

This application is a continuation of U.S. patent application Ser. No 07/831,047, filed Feb. 4, 1992, now abandoned.

BACKGROUND OF THE INVENTION

This invention relates generally to a suction-type robot hand and more particularly to a suction-type robot hand adapted to suck and transfer fragile articles such as a fried cutlet, a roasted bean curd, a bread and the like to a desired place.

A robot hand is known in the prior art, for example, from Japanese Patent Disclosure No. 63-251186 which uses two fingers for gripping articles or materials and transferring them to a desired place.

Other types of robot hands are disclosed, for example, in Japanese Patent Disclosure Nos. 64-8141 and 63-283884 wherein a suction pad mounted on a robot hand is adapted to hold articles by suction and transfer them to a desired place.

Another type of robot hand is disclosed in Japanese Utility Model Disclosure No. 61-58084 wherein a suction hand has a grid at a predetermined depth from an opening thereof so as to hold a bag by suction without forming wrinkle therein.

However none of the robot hands mentioned above can at once grip fragile articles such as a fried cutlet, a roasted bean curd, a piece of bread and the like to a desired place.

SUMMARY OF THE INVENTION

It is therefore an object of the present invention to provide a robot hand which can grip a fragile article and transfer it at once without breaking the articles.

The object of the present invention can be achieved by a suction-type robot hand comprising (a) a suction pad having a gas-permeable obstacle at an opening of the suction pad; and (b) a main body of the robot hand supporting the suction pad and having a vacuum passage communicating with the suction pad.

According to the robot hand of the present invention, the provision of the gas-permeable obstacle at the opening of the suction pad makes it possible to hold fragile articles by suction of the opening and or the obstacle without breaking them and to transfer them at once to a desired place.

BRIEF DESCRIPTION OF THE DRAWINGS

Other objects and advantages of the present invention will become apparent from the following detailed description of a preferred embodiment of the present invention taken with reference to the accompanying drawings in which.

DESCRIPTION OF THE PREFERRED EMBODIMENT

Figure 1:
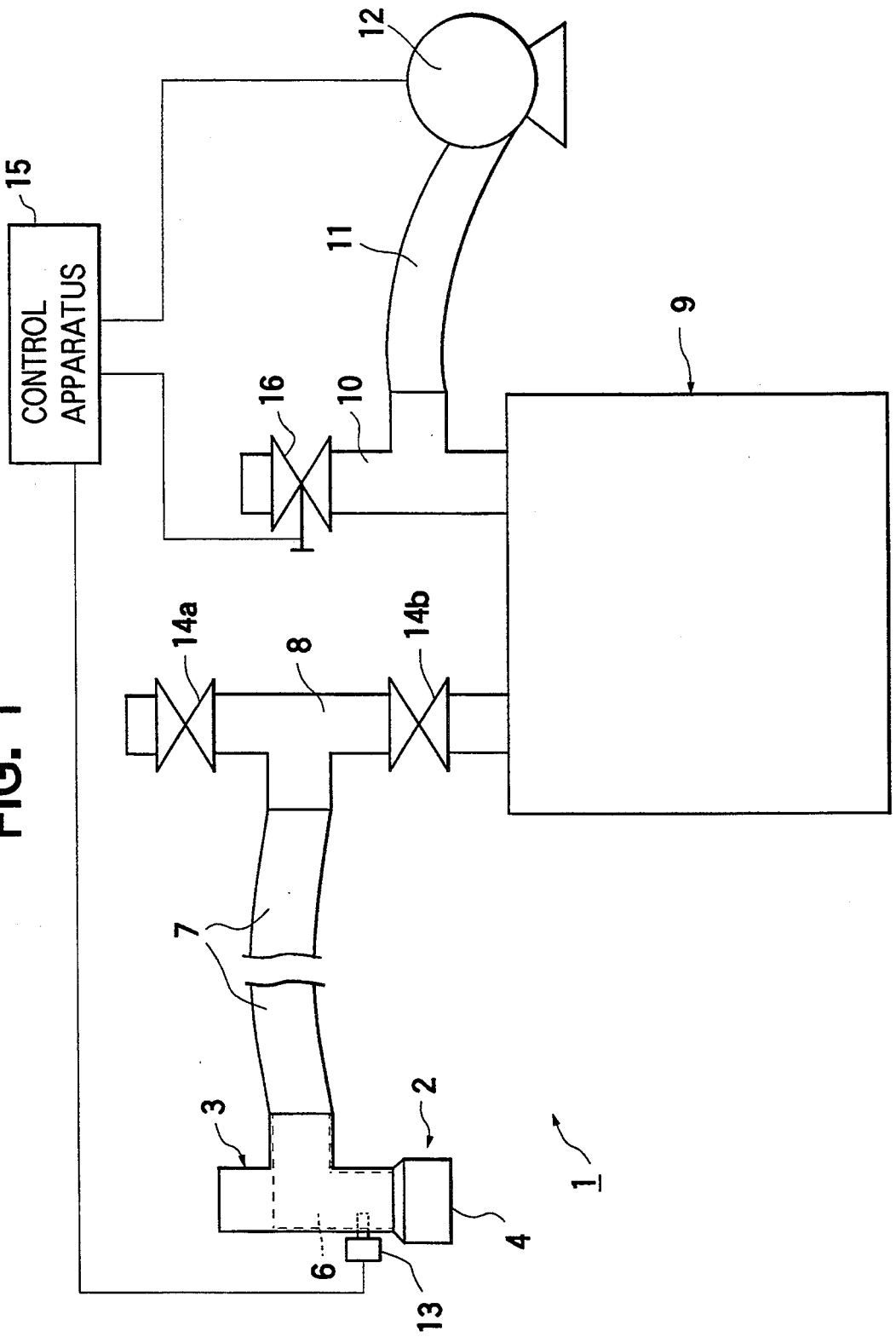
FIG. 1 is an explanatory schematic view of a preferred embodiment of a suction-type robot hand of the present invention.

As shown in FIG. 1 a suction-type robot hand 1 of the present invention is adapted to be mounted on a main body (not shown) of a robot and includes a suction pad 2 and a main body 3 of the robot hand 1.

Figure 2:
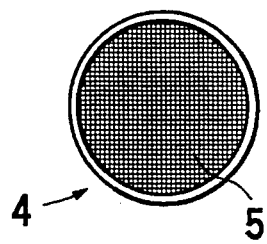
FIGS. 2(A)-2(C) are bottom views of suction pads of the robot hand shown in FIG. 1.
Figure 2:
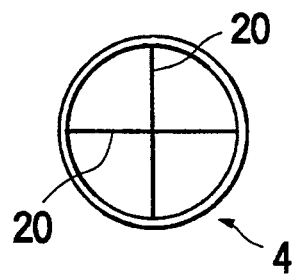
Figure 2:
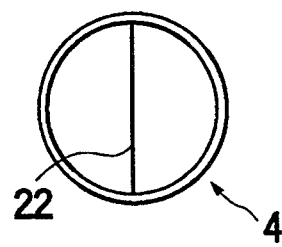

The configuration of the suction pad 2 shown in FIG. 2 is cylindrical. However it is not necessary to make it cylindrical and it may be any other configuration such as a prism, cone, pyramid and the like. There is also no limitation as to the material of the suction pad 2 and it may be formed of suitable material such as rubber, synthetic resin and the like.

The suction pad 2 has a net 5 which is positioned at an opening 4 of the suction pad 2. Accordingly, the fragile article is holded on the opening 4 and the net 5 without breaking the fragile article by suction because a large suction pressure is not applied to the article at a center of the opening 4.

The robot hand 3 has a pressure detector 13 close to the suction pad 2. The pressure detector 13 is connected to a control apparatus 15 so that the suction pressure in the suction pad 2 is controlled in accordance with the output of the detector 13 so as to maintain the appropriate suction pressure in the suction pad 2.

The net 5 may be replaced by a cross grid 20 shown in FIG. 2 (B) and a linear grid 22 shown in FIG. 2 (C) which are formed integrally with a main body of the suction pad 2.

The suction pad 2 is supported by the main body 3 of the robot hand 1 at the forward end thereof. A vacuum passage 6 is formed within the main body 3 of the robot hand 1 and one end of the vacuum passage 6 is in communication with the inside of the suction pad 2. The other end of the vacuum passage 6 is communicated with a tank 9 through a first vacuum pipe 7 and a first connecting pipe 8.

The tank 9 is connected to a pump 12 through a second connecting pipe 10 and a second vacuum pipe 11. The pipe 10 is connected to the control apparatus 15 through a valve 16. The tank 9 serves to hold therein water or debris of fragile articles entrained by the sucked air and to prevent them from being transmitted to the pump 12. With sufficient reduction of pressure within the tank 9 prior to the suction operation by the suction pad 2, it is possible to efficiently achieve the suction of articles in a short time.

The first vacuum pipe 7 has flexibility and length sufficiently accomodated to the motion of the robot. In addition, the first connecting pipe 8 is provided with a first ball valve 14a and a second ball valve 14b.

The operation of the suction-type robot hand 1 of the present invention will now be explained. First, the ball valve 14a is closed and the ball valve 14b is opened. Then the robot is energized and the suction pad 2 is moved toward and above the object articles.

The pump 12 is then energized and suction is commenced at a constant air flow rate. The air flow rate in this case should at least satisfy the following relation:

(degree of vacuum)×(area of the opening of the
suction pad)>(estimated maximum weight of the
predetermined amount of the objective particles)

The left side of the above expression indicates the suction force for elevating the object articles.

The vacuum obtained by the pump 12 is transmitted to the inside of the suction pad 2 through the second vacuum pipe 11, the second connecting pipe 10, the tank 9, the first connecting pipe 8, the first vacuum pipe 7 and the vacuum passage 6 of the main body 3 of the robot hand 1. This results in the fragile article being sucked against the opening 4 of the suction pad 2 and the net 5.

The robot is then moved toward an object place with the fragile articles sucked against the suction pad 2.

Finally the ball valve 14b is closed and the ball valve 14a is opened. This causes introduction of the ambient air to the inside of the suction pad 2 through the first connecting pipe 8, the first vacuum pipe 7 and the vacuum passage 6 of the main body 3 of the robot hand 1. Thus the suction force is dissipated from the suction pad 2 and the articles are released from the suction pad 2 onto the predetermined object place. In this case, it would be possible to more rapidly release the articles from the suction pad 2 if pressurized air is supplied from an air source (not shown) connected to the ball valve 14a.

Figure 3:
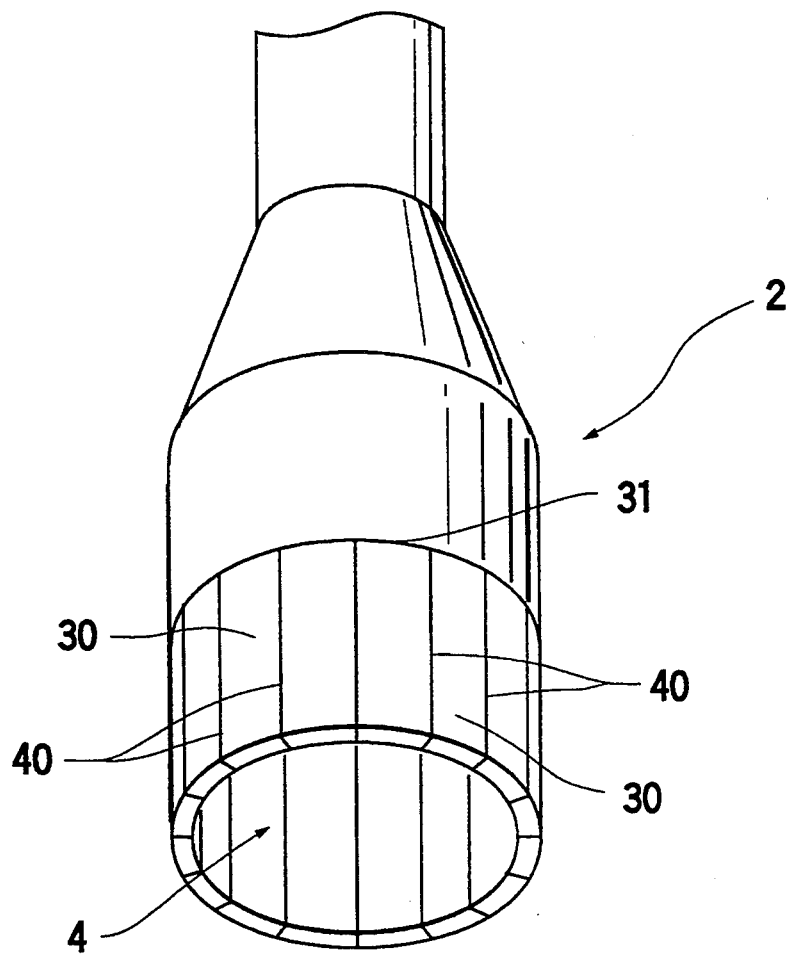
FIG. 3 is a perspective view of the suction pad having a plurality of flexible projections on an opening of thereof.

The other embodiment of a pad, as shown in FIG. 3, has a plurality of projections 30 which are circularly located on the opening, without any clearance between adjacent projections. Each projection 30 has a thin portion, at its lower position so that the projections 30 are inwardly bent by the suction in the pad 2. In accordance with the present embodiment, even though a surface of the article is not planar, it is possible to grasp the article by the pad 2 quickly and without breaking the article. The projections 30 may be formed by making a plurality of cuts 40 on a cylindrical member, which are parallel to the axis of the cylindrical member.

What is claimed is:

1. A suction-type robot hand comprising:
    a hollow suction pad having an opening at one end, and including at said opening plurality of flexible projections, adjacent projections having no clearance between them;
    a gas permeable obstacle at said opening of said pad;
    a pressure detector in said suction paid for detecting the pressure in said suction pad;
    a main body supporting said suction pad and having a vacuum passage formed therein, said vacuum passage communicating with said suction pad;
    a vacuum pump communicating with said suction pad through said vacuum passage; and
    adjustment means for adjusting suction pressure in said suction pad from said vacuum pump, said adjustment means being operatively connected to said pressure detector to adjust the pressure in said suction pad in accordance with the output of said pressure detector.

2. The robot hand of claim 1, wherein said gas-permeable obstacle is a net.

3. The robot hand of claim 1, wherein said gas-permeable obstacle is a linear grid formed integrally with said suction pad.

4. The robot hand of claim 1, wherein said gas-permeable obstacle is a cross grid formed integrally with said suction pad.

5. The robot hand of claim 1, further comprising a tank interposed between said suction pad and said vacuum pump.

6. The robot hand of claim 1, further comprising:
    a fluid passage in communication with said vacuum passage;
    a first valve selectively changeable between an open condition for connecting said vacuum pump with said fluid passage and a closed condition for disconnecting said vacuum pump from said fluid passage; and
    a second valve having an open condition when said first valve is in its closed condition for admitting air at at least atmospheric pressure into said fluid passage, and a closed condition when said first valve is in its open condition.

7. The robot hand of claim 6, further comprising a tank interposed between said first valve and said vacuum pump.

8. The robot hand of claim 6, wherein said first and second valves are ball valves.

9. A suction-type article metering robot hand comprising:
    a hollow suction pad having an opening at one end, said suction pad including at said opening a plurality of flexible projections, adjacent projections having no clearance between them;
    a gas permeable obstacle at said opening;
    a pressure detector in said suction paid for detecting the pressure in said suction pad;
    a main body supporting said suction paid and having a vacuum passage formed therein, said vacuum passage communicating with said suction pad;
    a vacuum pipe in communication with said vacuum passage;
    a connecting pipe in communication with said vacuum pipe;
    a tank having an inlet and an outlet, said inlet being in communication with said connecting pipe;
    a vacuum pump in communication with said outlet of said tank;
    adjustment means for adjusting suction pressure from said vacuum pump, said adjustment means being connected to said pressure detector so as to adjustment in pressure in said suction pad in accordance with the output of said pressure detector;
    a first valve located in said connecting pipe for closing off communication between said tank and said vacuum pipe; and
    a second valve located in said connecting pipe for admitting air at least atmospheric pressure into said vacuum pipe when said first valve closes off communication between said tank and said vacuum pipe.

10. The robot hand of claim 9, wherein said gas-permeable obstacle is a net.

11. The robot hand of claim 9, wherein said gas-permeable obstacle is a linear grid formed integrally with said suction pad.

12. The robot hand of claim 9, wherein said gas-permeable obstacle is a cross grid formed integrally with said suction pad.

13. The robot hand of claim 9, wherein said first and second valves are ball valves.

14. A suction-type robot hand adapted for sucking and transferring objective articles, said robot hand comprising:
    a hollow suction pad having an opening at one end;
    a gas permeable obstacle at said opening of said pad;
    a pressure detector in said suction paid for detecting the pressure in said suction pad;
    a main body supporting said suction pad and having a vacuum passage formed therein, said vacuum passage communicating with said suction pad;
    a vacuum pump communicating with said suction pad through said vacuum passage; and
    adjustment means for adjusting suction pressure in said suction pad from said vacuum pump, said adjustment means being operatively connected to said pressure detector to adjust the pressure in said suction pad in accordance with the output of said pressure detector, and said adjustment means adjusting the pressure in said suction pad in accordance with the relation:

(degree of vacuum)×(area of the opening of said suction pad)>(estimated maximum weight of the predetermined amount of the objective articles).

15. A suction-type article metering robot hand adapted for holding and transferring objective articles, said robot hand comprising:

a hollow suction pad having an opening at one end;
a gas permeable obstacle at said opening;
a pressure detector in said suction paid for detecting the pressure in said suction pad;
a main body supporting said suction paid and having a vacuum passage formed therein, said vacuum passage communicating with said suction pad;
a vacuum pipe in communication with said vacuum passage;
a connecting pipe in communication with said vacuum pipe;
a tank having an inlet and an outlet, said inlet being in communication with said connecting pipe;
a vacuum pump in communication with said outlet of said tank:
adjustment means for adjusting suction pressure from said vacuum pump, said adjustment means being connected to said pressure detector to adjust the pressure in said suction pad in accordance with the output of said pressure detector, and said adjustment means adjusting the pressure in said suction pad in accordance with the relation:

(degree of vacuum)×(area of the opening of said suction pad)>(estimated maximum weight of the predetermined amount of the objective articles);

a first valve located in said connecting pipe for closing off communication between said tank and said vacuum pipe; and
a second valve located in said connecting pipe for admitting air at least atmospheric pressure into said vacuum pipe when said first valve closes off communication between said tank and said vacuum pipe.

* * * * *